US006944732B2

(12) United States Patent
Thunquest et al.

(10) Patent No.: US 6,944,732 B2
(45) Date of Patent: Sep. 13, 2005

(54) METHOD AND APPARATUS FOR SUPPORTING SNAPSHOTS WITH DIRECT I/O IN A STORAGE AREA NETWORK

(75) Inventors: Gary Lee Thunquest, Berthoud, CO (US); Lawrence E. Rupp, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 10/141,319

(22) Filed: May 8, 2002

(65) Prior Publication Data

US 2003/0212752 A1 Nov. 13, 2003

(51) Int. Cl.[7] .......................... G06F 13/00; G06F 15/16; G06F 15/167

(52) U.S. Cl. ....................... 711/162; 711/100; 709/205; 709/213

(58) Field of Search ................................ 709/200, 213, 709/238; 711/100, 162, 200

(56) References Cited

U.S. PATENT DOCUMENTS

| | | | | | |
|---|---|---|---|---|---|
| 6,139,200 | A | * | 10/2000 | Goebel | 717/159 |
| 6,434,681 | B1 | * | 8/2002 | Armangau | 711/162 |
| 6,473,775 | B1 | * | 10/2002 | Kusters et al. | 707/200 |
| 6,694,413 | B1 | * | 2/2004 | Mimatsu et al. | 711/162 |
| 6,697,924 | B2 | * | 2/2004 | Swank | 711/163 |
| 6,748,504 | B2 | * | 6/2004 | Sawdon et al. | 711/162 |

* cited by examiner

*Primary Examiner*—Tuan V. Thai

(57) ABSTRACT

A method for a file server to support snapshots in a storage area network (SAN) providing a plurality of clients with concurrent direct I/O access to a file system in the SAN, in which the SAN uses an access protocol for file system access. The method includes operating the file server to: start to maintain, at a time T1, a time T1 snapshot volume of a live volume of data in the file system; receive, from a client C1 at a time subsequent to T1, an update access request for a portion of a file that includes data stored in access unit B1 of the live volume subsequent to time T1; and responsive to the update access request, allocate, to the time T1 snapshot volume, a new access unit B2 corresponding to access unit B1, and copy data stored in access unit B1 to access unit B2.

35 Claims, 3 Drawing Sheets

METHOD AND APPARATUS FOR SUPPORTING SNAPSHOTS WITH DIRECT I/O IN A STORAGE AREA NETWORK

FIELD OF THE INVENTION

The present invention relates to storage area networks with file sharing systems, and more particularly to methods and apparatus for implementing snapshots in storage area networks that allow clients to bypass file servers and perform direct I/O access in storage.

BACKGROUND OF THE INVENTION

At least one known file system includes a file server connected via a local area network (LAN) with a set of client accessing files maintained in storage by the file server. Network protocols such as network file system (NFS) and common Internet file system (CIFS) are used to communicate and coordinate file metadata and file content between the clients and the file server over the LAN.

The advent of storage area networks (SANs) and the need for increased file sharing performance has led to at least one known system in which clients perform read and writes of file data directly to storage in the SAN, thus avoiding the requirement that all I/O (input and output) pass through the file server. This system uses known NFS and CIFS protocols for communication of file metadata over the LAN, but uses the SAN interface to perform reads and writes directly to SAN storage.

In some cases, snapshots of a file system at a specific point in time are required, such as for performing backups of the file system. One known method for implementing snapshots of a file system copies a block of a file system when that block is written, to preserve the data as it existed at a selected time (i.e., the snapshot time). Either the old or the new data is copied or moved to a new storage location. However, copy-on-write systems experience coherency problems when clients attempt to access the same location in a file by direct I/O access rather than by obtaining file content from the file server.

SUMMARY OF THE INVENTION

One configuration of the present invention therefore provides a method for a file server to support snapshots in a storage area network (SAN) providing a plurality of clients with concurrent direct I/O access to a file system in the SAN, wherein the SAN uses an access protocol for file system access. The method includes operating the file server to: start to maintain, at a time T1, a time T1 snapshot volume of a live volume of data in the file system; receive, from a client C1, an update access request for a portion of a file that includes data stored in access unit B1 of the live volume subsequent to time T1; and responsive to the update access request, allocate, to the time T1 snapshot volume, a new access unit B2 corresponding to access unit B1, and copy data stored in access unit B1 to access unit B2.

Another configuration of the present invention provides a method for a client to support snapshots in a storage area network (SAN) providing a plurality of clients with concurrent direct I/O access to a file system in the SAN, wherein the SAN uses an access protocol for file system access. The method includes operating the client to: request a file server of the SAN for one of read only permission or update access permission to a portion of a file in one of a live volume or a snapshot volume of the file system; and receive, from the file server, first metadata indicating an access unit B1 in storage included in the portion of the file to which access has been requested and indicating a granted access permission for access unit B1.

Yet another configuration of the present invention provides a file server for a storage area network having a file system that utilizes an access protocol for file system access. The file server is configured to: start to maintain, at a time T1, a time T1 snapshot volume of a live volume of data in the file system; receive, from a client C1, an update access request for a portion of a file that includes data stored in access unit B1 of the live volume subsequent to time T1; and responsive to the update access request, allocate, to the time T1 snapshot volume, a new access unit B2 corresponding to access unit B1, and copy data stored in access unit B1 to access unit B2.

Still another configuration of the present invention provides a client for a storage area network (SAN) that uses a block access protocol for file system access. The client is configured to: request a file server of a SAN for one of read only permission or update access permission to a portion of a file in one of a live volume or a snapshot volume of the file system; and receive, from the file server, first metadata indicating a block B1 in storage included in the portion of the file to which access has been requested and indicating a granted access permission for block B1.

In yet another configuration, a network is provided that includes a file server, a client C1, and a storage system having a live volume of a file system stored thereon and using a block access protocol for file system access. The file server is configured to: start to maintain, at a time T1, a time T1 snapshot volume of the live volume of data in the file system; receive, from the client C1, an update access request for a portion of a file that includes data stored in block B1 of the live volume subsequent to time T1; and responsive to the update access request, allocate, to the time T1 snapshot volume, a new block B2 corresponding to block B1, and copy data stored in block B1 to block B2. Client C1 is configured to transmit the first update request for a portion of a file including data stored in block B1 of the live volume to the file server.

Yet another configuration of the present invention provides a machine readable medium or media having recorded thereon instructions configured to instruct a processor of a file server in a storage area network having a file system that utilizes a block access protocol for file system access. The instructions are configured to instruct the processor to: start to maintain, at a time T1, a time T1 snapshot volume of a live volume of data in the file system; receive, from a client C1, an update access request for a portion of a file that includes data stored in block B1 of the live volume subsequent to time T1; and responsive to the update access request, allocate, to the time T1 snapshot volume, a new block B2 corresponding to block B1, and copy data stored in block B1 to block B2.

In still another configuration, the present invention provides a machine readable medium or media having recorded thereon instructions configured to instruct a processor of a client in a storage area network (SAN) that uses a block access protocol for file system access. The instructions are configured to instruct the processor to: request a file server of a SAN for one of read only permission or update access permission to a portion of a file in one of a live volume or a snapshot volume of the file system; and receive, from the file server, first metadata indicating a block B1 in storage included in the portion of the file to which access has been requested and indicating a granted access permission for block B1.

Configurations of the present invention provide efficient support for snapshots in storage area networks having clients sharing files, and in which clients perform direct I/O to file data in storage. Network efficiency is increased while file coherency problems are avoided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
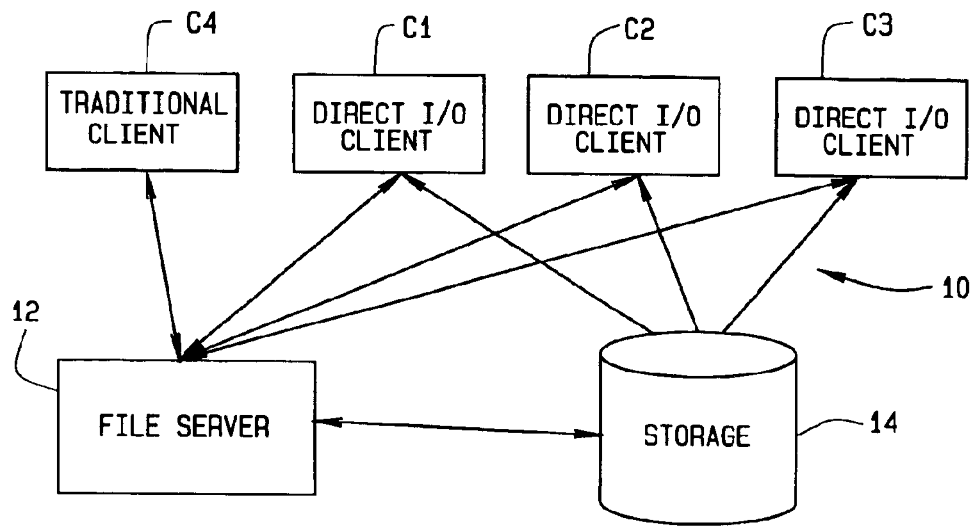
FIG. 1 is a simplified block diagram of one configuration of a storage area network. The configuration represented in FIG. 1 suffices to illustrate features of the present invention, but is not necessarily a typical configuration.

The following description of the preferred embodiment(s) is merely exemplary in nature and is in no way intended to limit the invention, its application, or uses.

The configurations described in detail below refer to "blocks" of data and a "block access protocol." However, the scope of the invention is not limited to configurations in which access to data occurs only in filesystem block units. Configurations in which the file server more generally manipulates "access units" (which may be, but need not be the same the same as filesystem blocks, if such blocks are present in a particular configuration) using an "access unit protocol" (which may be, but need not be the same as a filesystem block access protocol) are also considered to be within the scope of the present invention. For example, in some databases, a "record" constitutes an access unit, even though a record may have a different length than a filesystem block. The configurations described below can be generalized by noting that a block access protocol is considered as a particular type of access unit protocol and a block is considered as a particular type of access unit.

As used herein, the term "read only access" as applied to a block of data stored in a file system refers to permission to read the data stored in the block. The term "update access" as applied to a block of data stored in a file system refers to a permission at least sufficient to permit writing new data into the block. For example, a client having write permission to a block of data is considered as having update access to that block of data. A client having both read and write permission to the block of is also considered as having update access to that block of data. However, a client having only read permission to the block of data considered as having read only access and not update access to the block of data. A client having no permission to either read or write to a block of data is considered as having no access to the block of data.

Also as used herein, a client having update access to a block of data is considered as having greater access than a client having read only access to the same block of data. A client having either update access or read only access to a block of data is considered as having greater access than a client having no access to the same block of data. Reducing access to a block of data is referred to herein as "downgrading" access to the block of data, whereas increasing access to a block of data is referred to herein as "upgrading" access to the block of data.

Also as used herein, the numbers used in the designations B1, B2, and B3 are not intended to imply, by themselves, any ordering by time, importance, location, etc. The numbers in these designations are merely used to distinguish different instances of blocks or access units. Similarly, the numbers used in designations C1, C2, C3, and C4 also are not intended to imply an ordering by themselves, but are merely used to distinguish different instances of clients. Contrariwise, the designation T2 should be understood as implying a time later than a time T1.

In one configuration and referring to FIG. 1, a storage area network (SAN) 10 includes a file server 12, a storage system 14 comprising one or more storage devices (not shown separately), and a plurality of clients such as C1, C2, C3, and C4. File server 12 is a computing apparatus that serves file metadata and file data location to direct I/O clients such as C1, C2, and C3 that employ direct input/output (I/O) access to storage system 14. In one configuration, file server 12 also serves file metadata and file data to one or more traditional clients, such as client C4, using network file system (NFS) and/or common Internet file system (CIFS, also known as server message block or SMB) protocols as is known in the art, or any other suitable remote file access protocol. However, it is not necessary to provide file server 12 with the capability to service traditional clients when such clients are absent from network 10.

SAN 10 includes one or more direct I/O clients such as C1, C2, and C3, which comprise one or more computing apparatus. In one configuration, each direct I/O client C1, C2, and C3 is a separate computing apparatus. However, in another configuration not shown in FIG. 1, each client need not be a separate computing apparatus. For example, one or more clients such as C1 and C2 are processes or threads executing in a single computing apparatus that can be separately addressed via network 10.

Each direct I/O client C1, C2 and C3 accesses files by communicating directly with file server 12 using, for example, NFS and/or CIFS protocols. File server 12 responds to such communication by returning file data location information (i.e., metadata) using a file location protocol. However, file data itself is accessed by a direct I/O client such as client C1, C2, or C3 by communicating directly with storage system 14 utilizing block or object oriented access protocols, bypassing file server 12. In one configuration, these communications occur via Fibre Channel. Configurations of the present invention will have one or more direct I/O clients and zero or more traditional clients.

Storage system 14 serves blocks of data to both file server 12 and direct I/O clients such as C1, C2, and C3 using one or more block access protocols. Communication is via Fibre Channel in one configuration, but in another configuration, one or more shared small computer system interface (SCSI) interfaces are used instead of or in addition to Fibre Channel. For example, communication between storage 14 and file server 12 is via SCSI interfaces in one configuration.

Figure 2:
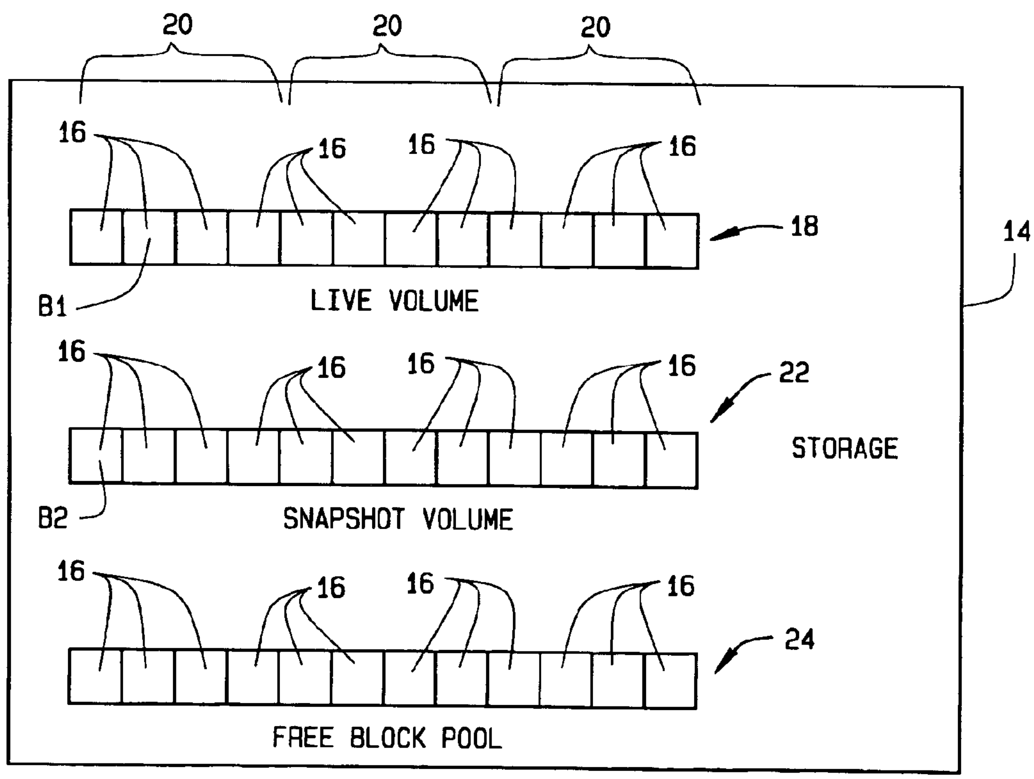
FIG. 2 is a representation of one configuration of a file system suitable for use in the storage area network of FIG. 1. The file system includes a live volume and a snapshot volume, in which files in the filesystem are stored and accessed using a block access protocol.

Storage system 14 includes one or more storage devices (not shown in FIG. 1) on which blocks of a file system are stored. In one configuration and referring to FIG. 2, zero or more blocks 16 are allocated to a "live" volume 18 of the file system by file server 12. For the sake of convenience, live volume 18 is shown in FIG. 2 as though it comprises a set of contiguous blocks 16. However, in principle, blocks 16 of live volume 18 could be scattered at different physical locations in storage system 14, and both the number of blocks 16 and their locations may vary with time as data is written to, changed, and/or erased from live volume 18. File server 12 keeps track of physical and logical locations of blocks 16 and files 20 in storage system 14.

In addition to live volume 18, zero or more blocks 16 are also allocated to a "snapshot" volume 22 that represents the state of live volume 18 at a selected instant in time, for example, time T1. (A snapshot volume 22 representing the state of a live volume at time T1 is sometimes referred to herein as a "time T1 snapshot volume.") Snapshot volume 22 need not have the same number of blocks 16 as live volume 18, and it is expected that equality would occur only rarely because of the manner in which snapshot volume 22 is created and maintained. For example, in one configuration, snapshot volume 22 starts with an allocation of zero blocks 16, but file server 12 increases this allocation as blocks in live volume 18 already allocated at time T1 are overwritten. More particularly, each nonempty file 20 (i.e., any file that contains data) in live volume 18 comprises one or more blocks 16 in live volume 18. At time T1, when snapshot volume 22 is created and initialized, there is no difference in content between snapshot volume 22 and live volume 18, so read only access to a file in snapshot volume 22 can be performed on the file in live volume 18. Thus, snapshot volume 22, when initialized, contains zero blocks 16 of file data. (Depending on the file system, however, it may contain blocks of data used to maintain the file system, such as a file allocation table.) When a block B1 of data in a file 20 in live volume 18 is to be updated (i.e., written to) after time T1, a previously unallocated (i.e., new) block B2 added to snapshot volume 22. For example, new block B2 is obtained from a free block pool 24 in storage system 14 and allocated to snapshot volume 22. Before block B1 is overwritten, its data is copied into block B2. In configurations in which a file allocation table is kept in snapshot volume 22, this file allocation table is also updated to reflect the replacement of block B1 with block B2. Block B1 is updated only after its contents have been copied into block B2. Subsequent access to data corresponding to block B1 in live volume 18 is from block B1, but subsequent access to corresponding data in snapshot volume 22 is from block B2. Thus, snapshot volume 22 dynamically grows as changes are made to live volume 18. Because blocks 16 of files 20 are copied only when updates occur, the total number of blocks 16 that must be allocated to snapshot volume 22 can be substantially smaller than the number of blocks 16 allocated to live volume 18. In addition, the possibility of long access delays is reduced because it is not necessary to copy the entirety of live volume 18 to a snapshot volume 22 all at one time unless all blocks 16 allocated to files 20 are updated all at once (an unlikely occurrence).

In another configuration, all blocks 16 of snapshot volume 22 are allocated to snapshot volume 22 at its time of creation T1. For example, snapshot volume 22 is pre-allocated the same number of blocks 16 for holding file data as have been allocated for live volume 18, or at least a sufficient number of blocks 16 to contain all of the changes that may occur to live volume 18 during the lifetime of snapshot volume 22. In this case, a free block pool 24 is unnecessary. New blocks 16 for allocation in snapshot volume 22 (such as B2) are obtained from blocks 16 of snapshot volume 22 that are not already allocated rather than from a free block pool 24. This configuration does not have a substantially smaller snapshot volume 22 than live volume 18. However, the advantage of the reduction of the possibility of long access delays is obtained as this embodiment also does not usually require the entirety of live volume 18 to be copied to a snapshot volume 22 all at one time.

Copying of the contents of block B1 in live volume 18 to block B2 in snapshot volume 22 is performed only upon the first update to block B1. Subsequent updates to block B1 in live volume 18 do not result in further copying or allocation of blocks to snapshot volume 22. In addition, only those blocks 16 containing file data in live volume 18 at time T1 are copied into snapshot volume 22 when updated. New files written to live volume 18 after time T1 are not copied into snapshot volume 22 because they are not part of the "snapshot." Also, some files 20 may grow in length after time T1 by adding new blocks 16 in live volume 18. Such new blocks are also not considered as part of the "snapshot." Files that shrink or are deleted by deallocating blocks 16 in live volume 18 are, however, considered as part of the "snapshot." Thus, a deallocation of a block 16 after time T1 that was part of a file 20 in live volume 18 at time T1 is considered as an "update" to the deallocated block, resulting in the deallocated block being copied to a new block 16 in snapshot volume 22.

Although not shown in FIG. 2, in one configuration, there are additional live volumes 18 in storage 14 and/or additional snapshot volumes 22. For example, one configuration includes a snapshot volume 22 for each live volume 18, while another configuration includes different snapshot volumes 22 representing snapshots of a single live volume 18 at different times T1, T2, etc. In one configuration, a snapshot volume 22 representing a snapshot at T1 is deleted or deallocated and replaced by another snapshot volume 22 at a later time T2.

To provide direct client I/O, file server 12 passes file location information to direct I/O clients such as C1, C2, and C3 so that these clients perform direct I/O to the correct blocks 16. For example, upon receiving a request from a client C1, C2, or C3 for read access to a portion of a file, file server 12 transmits one or more a logical unit numbers and block numbers to the requesting client along with an indication of a permission to signify the level of access that is being granted. For example, the permission indication in one configuration comprises a permission byte for each block 16 in the response. The value of the permission byte signifies whether reading, writing, or both is permitted for the corresponding block 16. The absence of a signal can also be used as a permission indication. For example, the absence of a permission byte is used in one configuration to indicate that a predetermined level of access has been granted and in another configuration to indicate that the requested level of access matches the level granted. File server 12 is also configured to "push" unsolicited location and permission information to clients in the event a permission and/or location is changed dynamically, such as by concurrent use of the file by another client or as a result of another timed snapshot volume being created. Also in one configuration, file server 12 is configured to receive requests transmitted by a direct I/O client such as C1, C2, or C3 to change permission information for a block of data. Depending upon the state of the file system, such a request may result in a transmission from file server 12 to the requesting client signifying no change in location or access permission, a change in access permission, or a change in both location and access permission.

Figure 3A:
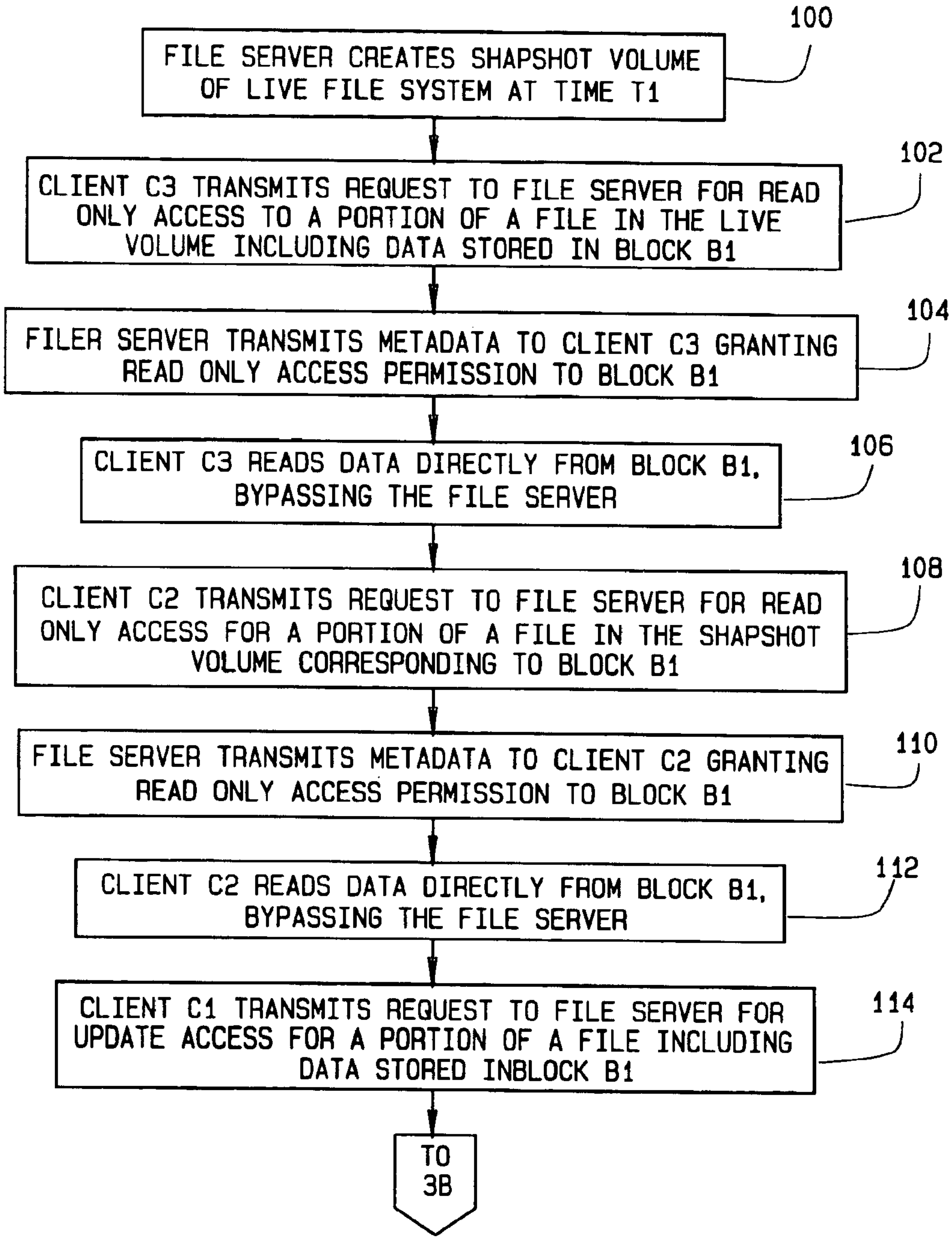
FIG. 3 is a flow chart of one configuration of the present invention.
Figure 3B:
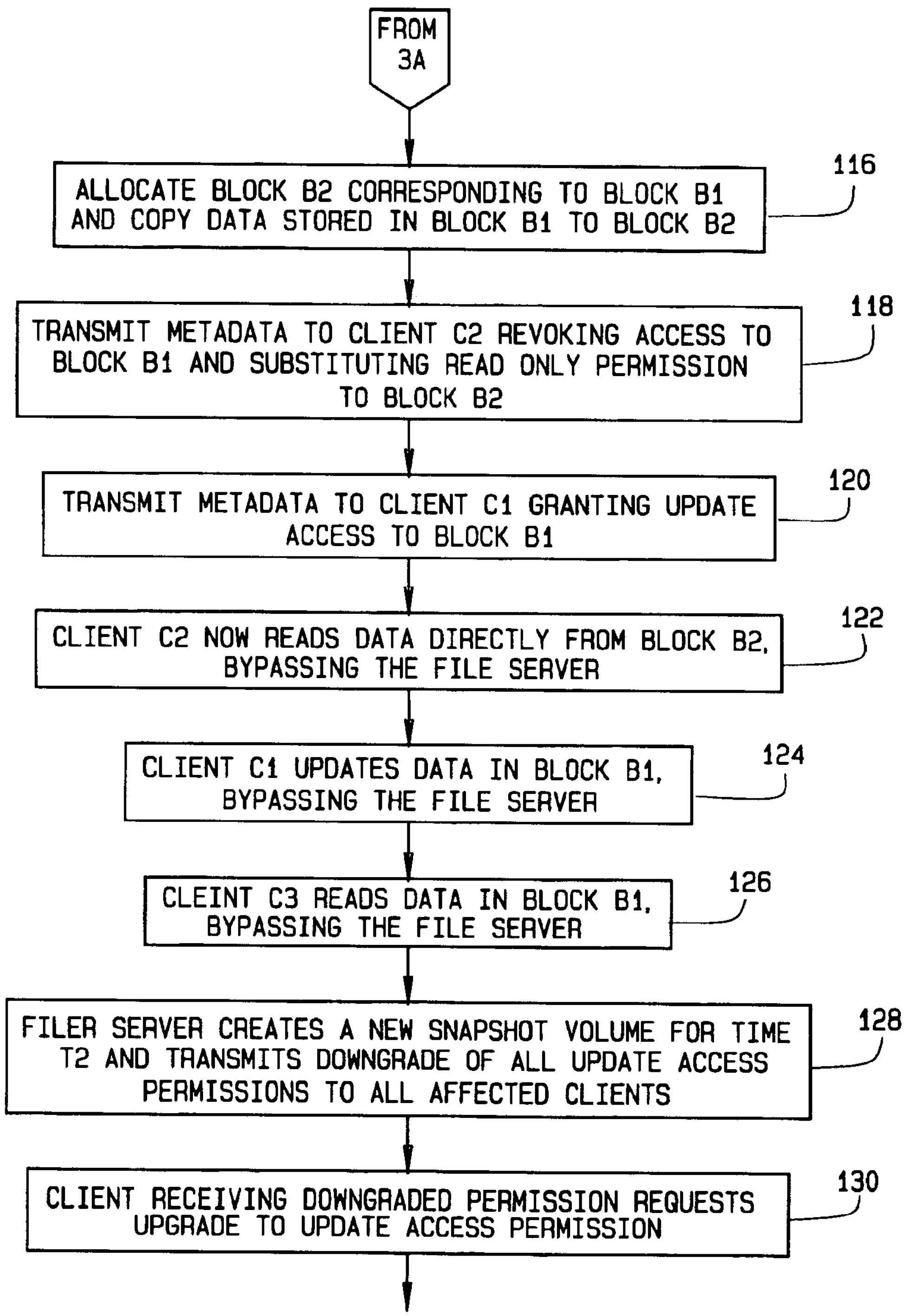

The flow chart of FIG. 3 provides an example of the operation of the network shown in FIG. 1. (Steps taken to service traditional client C4 are not shown in FIG. 3.) At time T1, file server 12 creates 100 a snapshot volume 22 of a live volume of data at time T1. At this time, there are no allocated blocks in snapshot volume 22. At a later time, client C3 transmits 102 a request to file server 12 for read only access to a portion of a file 20 in live volume 18 that includes data stored in block B1. To do so in one configuration, client C3 transmits a request to file server 12 to mount live volume 18 for read access. File server 12 acknowledges this request, and client C3 then transmits a read request to file server 12. File server 12 determines that this read request includes block B1, for example, by consulting a file allocation table. File server 12 responds by transmitting 104 metadata to client C3 granting read only access permission to block B1. This metadata includes both location and permission information. The location information is that needed by storage system 14 to locate the requested data in physical storage, for example, a logical block number and a unit number. The metadata also includes a permission byte indicating the access permission to block B1 granted by file server 12 to client C3. (In one configuration, an absence of a permission byte is also used as an indication of a permission level, as explained above.) Normally, the permission granted is the same as that requested, so client C3 would thus receive read only access permission to block B1 and thus have everything needed to access block B1 using direct I/O.

If a requested portion of the file were to include additional blocks, file server 12 would also transmit additional metadata with appropriate permission to these other blocks. Henceforth, it will be assumed that all requests and metadata in this example refer to a single block, as in one configuration, multiblock operations are performed by straightforward iteration.

Having obtained read only access permission and the location of block B1, client C3 reads 106 data directly from block B1 by sending a read request directly to storage system 14, bypassing file server 12. Client C3 can read block B1 as needed, until permission is revoked by file server 12 or relinquished by client C3.

While client C3 is reading block B1 in live volume 18, another client such as C2 may require access to the same file in the snapshot volume, for example, to make a backup of the file. For example, client C2 has already mounted snapshot volume 22 for read only access and has reached a point in the backup at which client C2 transmits 108 a request to file server 12 for access to the same portion of the file requested by client C3 in step 102, i.e., a portion corresponding to block B1 in live volume 18. Because block B1 has not yet been updated, file server 22 transmits 110 metadata to client C2 granting read only access permission to block B1. Client C2 then reads 112 data directly from block B1 by direct I/O request to storage system 14, bypassing file server 12. Clients C2 and C3 are thus able to concurrently access the same block B1 even though client C2 is accessing snapshot volume 22 and client C accessing live volume 18 because no update to block B1 has yet occurred.

At this point, another client C1 is running a process, for example, a database server, which is ready to update data in the same file and block being access by both clients C2 and C3. Thus, client C1 transmits 114 a request to file server 12 for update access for a portion of the file, including data stored in block B1. For example, client C1 has mounted live volume 18 for read and write access and is now requesting to write data that file server 12 determines is to be stored at block B1. File server 12, upon receiving this request, allocates 116 a new block B2 to snapshot volume 22 and copies the data from block B1 into block B2, so that block B2 corresponds to block B1 in live volume 18 as it existed at time T1, the snapshot time. File server 12 then transmits 118 metadata to client C2, which has permission to read snapshot data. The metadata transmitted to client C2 revokes access to block B1 and substitutes read only permission for block B2 in snapshot volume 22. Next, file server 12 transmits 120 metadata to client C1 granting update access to block B1. In this case, the update permission includes read and write permission, but if only write permission had been requested (for example, by client C1 mounting live volume 18 for write only access), the update permission would include only write permission. Now, client C3 is able to read the live version of the data, while client C2 is still able to read the snapshot version of the data directly from storage 14, bypassing file server 12. In this example, client C2 does read 122 data directly from block B2, bypassing the file server and obtaining data from the snapshot. Next in this example, client C1 updates 124 data in block B1, bypassing the file server, and changing the data in the live volume. Afterwards, client C3, which still has read access to block B1 on live volume 18, reads 126 data in block B1, bypassing file server 12 and thus reading the new data written by client C1. Client C1 retains update access to block B1, and so can write (or read and write) further updates to block B1 that can be read by client C3 but which are not seen by client C2. However, the second and any subsequent times block B1 is updated, no further allocation of blocks and copying of data into snapshot volume 22 is performed.

At a subsequent time T2, another snapshot volume of live volume 18 is created 128 by file server 12 and a downgrade of all update access permissions to read only access permission is transmitted by file server 12 to all clients having write access to blocks in live volume 18. In this example, only client C1 has update access to live volume 18, so file server downgrades the update access granted to client C1 for block B1 to read only access. This downgrade ensures that all the data necessary for a snapshot of live file system 18 at time T2 is preserved. When a process running in client C1 needs to update block B1 in live volume 18 (or any other block for which access has been downgraded), client C1 transmits 130 an upgrade request for the block needing the update so that it once again has appropriate permission in live volume 18.

In one configuration of the present invention, file server 12 and clients C1, C2, and C3 are computing systems each having a conventional processor and an associated memory electrically coupled to and responsive to the processor. The choice of processor, memory, and interconnection technique is a design choice that may be made by one skilled in the art upon reaching an understanding of the various configurations of the present invention described herein. In one configuration, one or more of file server 12 and clients C1, C2, and C3 are provided with one or more media readers, such as floppy disk drives and/or CD-ROM drives, to read instructions from a removable, machine-readable medium or media having instructions recorded thereon to instruct the processor to perform appropriate steps of the methods disclosed herein. (By "appropriate," it is meant that the medium or media need only have instructions for a file server if the processor is in the file server, or instructions for a client, if the processor is in the client. However, in one configuration, a medium or media has both sets of instructions recorded thereon, but only one is read by the media reader.) In another configuration, one or more of clients C1, C2, and C3 and file server 12 have hard disk drives or other another machine-readable, non-removable medium or media on which the instructions are recorded and from which they are read. In yet another configuration, the machine-readable medium or media is external to one or more file server 12 and clients C1, C2, and C3, and transmitted to file server 12 and/or clients C1, C2, and C3 as electronic signals. An example of the latter configuration is one in which client C1 retrieves these instructions using an Internet file transfer protocol (FTP) from recorded media comprising a file system of a remote host in another city. In yet another configuration, the instructions are stored in storage unit 14 and read by file server 12 and/or clients C1, C2, and C3.

It will thus be observed that configurations of the present invention provide efficient support for snapshots in storage area networks having clients sharing files, and in which clients are allowed to perform direct I/O to file data in storage. Efficiency of the network is increased by the use of direct I/O, yet file coherency problems otherwise associated with "copy on write" systems in which more than one client is able to access data at the same time are avoided.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method to support snapshots in a storage area network (SAN) providing a plurality of clients with concurrent direct I/O access to a file in the SAN, wherein the SAN uses an access unit protocol for file system access, said method comprising operating a file server to:

start to maintain, at a time T1, a time T1 snapshot volume of a live volume of data in the file system;

receive, from a client C1, at a time subsequent to T1, an update access request for a portion of a file that includes data stored in access unit B1 of the live volume;

responsive to the update access request, allocate, to the time T1 snapshot volume, a new access unit B2 corresponding to access unit B1, and copy data stored in access unit B1 to access unit B2; and move, responsive to data being copied into access unit B2, access permissions for a client C2 so that client C2 accesses data from access unit B2 instead of access unit B1.

2. A method in accordance with claim 1 further comprising operating the file server to:

receive a read only access request from a client C2 for a portion of a time T1 snapshot of a file that includes data corresponding to data stored in access unit B1, wherein said read only access request is received after time T1 and prior to receipt of said update access request;

transmit first metadata to client C2 granting read only access permission to access unit B1 prior to receipt of the first update access request for access unit B1; and transmit second metadata to client C2 granting read only access permission to access unit B2 and revoking access to access unit B1 after copying data stored in access unit B1 to access unit B2.

3. A method in accordance with claim 2 further comprising operating the file server to transmit third metadata to client C1 granting update access permission to access unit B1 after said transmission of second metadata to client C2.

4. A method in accordance with claim 1 further comprising operating the file server to receive a read only access request from a client C3 for a portion of a file in the live volume including data stored in access unit B1, and transmit fourth metadata to client C3 granting read only access permission to access unit B1.

5. A method in accordance with claim 1 further comprising, after time T1 and prior to receiving said first update request, operating the file server to transmit metadata to each client having update access permission to any access unit of the live filesystem downgrading said update access to read only access permission.

6. A method in accordance with claim 1 further comprising operating client C1 to transmit the first update request for a portion of a file including data stored in access unit B1 of the live volume to the file server.

7. A method in accordance with claim 6 further comprising operating the file server to:

receive a read only access request from a client C2 for a portion of a time T1 snapshot of a file that includes data corresponding to data stored in access unit B1, wherein said read only access request is received after time T1 and prior to receipt of said update access request;

transmit first metadata to client C2 granting read only access permission to access unit B1 prior to receipt of the first update access request for access unit B1; and transmit second metadata to client C2 granting read only access permission to access unit B2 and revoking access to access unit B1 after copying data stored in access unit B1 to access unit B2;

and operating client C2 to:

transmit the read only access request for the portion of the time T1 snapshot of the file;

receive the transmitted first metadata granting read only access permission to access unit B1;

bypass the file server to read data from access unit B1 while said read only access permission to access unit B1 is valid;

receive the transmitted second metadata granting read only access permission to access unit B2 and revoking access permission to access unit B1; and read data from access unit B2 while said read only access permission to access unit B2 is valid.

8. A method in accordance with claim 7 further comprising operating the file server to:

transmit third metadata to client C1 granting update access permission to access unit B1 after said transmission of second metadata to client C2;

and operating client C1 to:

receive the third metadata transmitted by the file server; and bypass the file server to update data in access unit B1.

9. A method in accordance with claim 6 further comprising operating the file server to:

receive a read only access request from a client C3 for a portion of a file in the live volume including data stored in access unit B1; and transmit fourth metadata to client C3 granting read only access permission to access unit B1;

and operating client C3 to:

transmit said read only access request to the file server for a portion of a file in the live volume including data stored in access unit B1, receive said fourth metadata; and bypass said file server to read data stored in access unit B1.

10. A method to support snapshots in a storage area network (SAN) providing a plurality of clients with concurrent direct I/O access to a file system in the SAN, wherein the SAN uses an access protocol for file system access, said method comprising operating a client to:

request a file server of the SAN for permission to access a portion of a file in one of a live volume or a snapshot volume of the file system;

receive, from the file server, first metadata indicating an access unit B1 in storage included in the portion of the file to which access has been requested and indicating a granted access permission for access unit B1;

bypass the file server to access said access unit B1;

receive from said file server, after an update to access unit B1 that has resulted in data being copied into a replacement access unit B2 representing the previous contents of access unit B2, second metadata revoking access to access unit B1 and indicating the replacement access unit B2 and a granted access permission for access unit B2.

11. A method in accordance with claim 10 further comprising operating the client to bypass the file server to access said access unit B1 in storage.

12. A method in accordance with claim 10 wherein the granted access permission for access unit B1 is less than a requested access permission, and further comprising operating the client to request the file server of the SAN for upgraded access permission for access unit B1.

13. A method in accordance with claim 12 wherein the granted access permission for access unit B2 is less than the granted access permission to access unit B1, and further comprising operating the client to request the file server of the SAN for upgraded access permission for access unit B2.

14. A file server for a storage area network having a file system that utilizes an access protocol for file system access, said file server configured to:

start to maintain, at a time T1, a time T1 snapshot volume of a live volume of data in the file system;

receive, from a client C1 at a time subsequent to T1, an update access request for a portion of a file that includes data stored in access unit B1 of the live volume; and responsive to the update access request, allocate, to the time T1 snapshot volume, a new access unit B2 corresponding to access unit B1, and copy data stored in access unit B1 to access unit B2; and move, responsive to data being copied into access unit B2, access permissions for a client C2 so that client C2 accesses data from access unit B2 instead of access unit B1.

15. A file server in accordance with claim 14 further configured to:

receive a read only access request from a client C2 for a portion of a time T1 snapshot of a file that includes data corresponding to data stored in access unit B1, wherein said read only access request is received after time T1 and prior to receipt of said update access request;

transmit first metadata to client C2 granting read only access permission to access unit B1 prior to receipt of the first update access request for access unit B1; and transmit second metadata to client C2 granting read only access permission to access unit B2 and revoking access to access unit B1 after copying data stored in access unit B1 to access unit B2.

16. A file server in accordance with claim 15 further configured to transmit third metadata to client C1 granting update access permission to access unit B1 after said transmission of second metadata to client C2.

17. A file server in accordance with claim 14 further configured to receive a read only access request from a client C3 for a portion of a file in the live volume including data stored in access unit B1, and transmit fourth metadata to client C3 granting read only access permission to access unit B1.

18. A file server in accordance with claim 14 further configured to transmit metadata to each client having update access permission to any access unit of the live filesystem downgrading said update access to read only access permission, after time T1 and prior to receiving said first update request.

19. A client for a storage area network (SAN) that uses an access protocol for file system access, said client configured to:

request a file server of a SAN for permission to access a portion of a file in one of a live volume or a snapshot volume of the file system;

receive, from the file server, first metadata indicating an access unit B1 in storage included in the portion of the file to which access has been requested and indicating a granted access permission for access unit B1;

bypass the file server to access said access unit B1; and receive from said file server, after an update to access unit B1 that has resulted in data being copied into a replacement access unit B2 representing the previous contents of access unit B1, second metadata revoking access to access unit B1 and indicating the replacement access unit B2 and a granted access permission for access unit B2.

20. A client in accordance with claim 19 further configured to bypass the file server to access said access unit B1 in storage.

21. A client in accordance with claim 19 further configured to request the file server of the SAN for upgraded access permission for access unit B1 when the granted access permission for access unit B1 is less than a requested access permission.

22. A client in accordance with claim 21 further configured to request the file server of the SAN for upgraded access permission for access unit B2 when the granted access permission for access unit B2 is less than the granted access permission to access unit B1.

23. A network comprising a file server, a client C1, and a storage system having a live volume of a file system stored thereon and using an access protocol for file system access, wherein said file server is configured to:

start to maintain, at a time T1, a time T1 snapshot volume of the live volume of data in the file system;

receive, from said client C1 at a time subsequent to T1, an update access request for a portion of a file that includes data stored in access unit B1 of the live volume; and responsive to the update access request, allocate, to the time T1 snapshot volume, a new access unit B2 corresponding to access unit B1, and copy data stored in access unit B1 to access unit B2;

and said client C1 is configured to:

transmit the first update request for a portion of a file including data stored in access unit B1 of the live volume to the file server.

24. A network in accordance with claim 23 further comprising a client C2 and wherein said file server is further configured to:

receive a read only access request from client C2 for a portion of a time T1 snapshot of a file that includes data corresponding to data stored in access unit B1, wherein said read only access request is received after time T1 and prior to receipt of said update access request;

transmit first metadata to client C2 granting read only access permission to access unit B1 prior to receipt of the first update access request for access unit B1; and transmit second metadata to client C2 granting read only access permission to access unit B2 and revoking access to access unit B1 after copying data stored in access unit B1 to access unit B2;

and wherein client C2 is configured to:

transmit the read only access request for the portion of the time T1 snapshot of the file;

receive the transmitted first metadata granting read only access permission to access unit B1;

bypass the file server to read data from access unit B1 while said read only access permission to access unit B1 is valid;

receive the transmitted second metadata granting read only access permission to access unit B2 and revoking access permission to access unit B1; and read data from access unit B2 while said read only access permission to access unit B2 is valid.

25. A network in accordance with claim 24 wherein the file server is further configured to:

transmit third metadata to client C1 granting update access permission to access unit B1 after said transmission of second metadata to client C2;

and client C1 is further configured to:

receive the third metadata transmitted by the file server; and bypass the file server to update data in access unit B1.

26. A network in accordance with claim 23 further comprising a client C3 and wherein said file server is further configured to:

receive a read only access request from client C3 for a portion of a file in the live volume including data stored in access unit B1; and transmit fourth metadata to client C3 granting read only access permission to access unit B1;

and wherein client C3 is configured to:

transmit said read only access request to the file server for a portion of a file in the live volume including data stored in access unit B1, receive said fourth metadata; and bypass said file server to read data stored in access unit B1.

27. A machine readable medium or media having recorded thereon instructions configured to instruct a process of a file server in a storage area network having a file system that utilizes an access protocol for file system access to:

start to maintain, at a time T1, a time T1 snapshot volume of a live volume of data in the file system;

receive, from a client C1 at a time subsequent to T1, an update access request for a portion of a file that includes data stored in access unit B1 of the live volume;

responsive to the update access request, allocate, to the time T1 snapshot volume, a new access unit B2 corresponding to access unit B1, and copy data stored in access unit B1 to access unit B2; and move, responsive to data being copied into access unit B2, access permissions for a client C2 so that client C2 accesses data from access unit B2 instead of access unit B1.

28. A machine readable medium or media in accordance with claim 27 further having recorded therein instructions configured to instruct the processor to:

receive a read only access request from a client C2 for a portion of a time T1 snapshot of a file that includes data corresponding to data stored in access unit B1, wherein said read only access request is received after time T1 and prior to receipt of said update access request;

transmit first metadata to client C2 granting read only access permission to access unit B1 prior to receipt of the first update access request for access unit B1; and transmit second metadata to client C2 granting read only access permission to access unit B2 and revoking access to access unit B1 after copying data stored in access unit B1 to access unit B2.

29. A machine readable medium in accordance with claim 28 further having recorded thereon instructions configured to instruct the processor to transmit third metadata to client C1 granting update access permission to access unit B1 after said transmission of second metadata to client C2.

30. A machine readable medium or media in accordance with claim 27 further having recorded thereon instructions configured to instruct the processor to receive a read only access request from a client C3 for a portion of a file in the live volume including data stored in access unit B1, and transmit fourth metadata to client C3 granting read only access permission to access unit B1.

31. A machine readable medium or media in accordance with claim 27 further having recorded thereon instructions configured to instruct the processor to transmit metadata to each client having update access permission to any access unit of the live filesystem downgrading said update access to read only access permission, after time T1 and prior to receiving said first update request.

32. A machine readable medium or media having recorded thereon instructions configured to instruct a processor of a client in a storage area network (SAN) that uses an access protocol for file system access to:

request a file server of a SAN for permission to access a portion of a file in one of a live volume or a snapshot volume of the file system;

receive, from the file server, first metadata indicating an access unit B1 in storage included in the portion of the file to which access has been requested and indicating a granted access permission for access unit B1;

bypass the file server to access said access unit B1; and receive from said file server, after an update to access unit B1 that has resulted in data being copied into a replacement access unit B2 representing the previous contents of access unit B1, second metadata revoking access to access unit B1 and indicating the replacement access unit B2 and a granted access permission for access unit B2.

33. A machine readable medium or media in accordance with claim 32 further having recorded therein instructions configured to instruct the processor to bypass the file server to access said access unit B1 in storage.

34. A machine readable medium or media in accordance with claim 32 further having recorded thereon instructions configured to instruct the processor to request the file server of the SAN for upgraded access permission for access unit B1 when the granted access permission for access unit B1 is less than a requested access permission.

35. A machine readable medium or media in accordance with claim 34 further having recorded thereon instructions configured to instruct the processor to request the file server of the SAN for upgraded access permission for access unit B2 when the granted access permission for access unit B2 is less than the granted access permission to access unit B1.

* * * * *

UNITED STATES PATENT AND TRADEMARK OFFICE

CERTIFICATE OF CORRECTION

PATENT NO. : 6,944,732 B2
APPLICATION NO. : 10/141319
DATED : September 13, 2005
INVENTOR(S) : Gary Lee Thunquest et al.

It is certified that error appears in the above-identified patent and that said Letters Patent is hereby corrected as shown below:

In column 7, line 58, delete “C” and insert -- C3 is --, therefor.

Signed and Sealed this

Ninth Day of November, 2010

David J. Kappos

David J. Kappos
*Director of the United States Patent and Trademark Office*